US005801694A

United States Patent [19]

Gershen

[11] Patent Number: 5,801,694

[45] Date of Patent: Sep. 1, 1998

[54] METHOD AND APPARATUS FOR INTERACTIVELY CREATING NEW ARRANGEMENTS FOR MUSICAL COMPOSITIONS

[76] Inventor: Joseph S. Gershen, 1819 11th St., Santa Monica, Calif. 90404

[21] Appl. No.: 567,370

[22] Filed: Dec. 4, 1995

[51] Int. Cl.⁶ .............................. G06F 3/00; G09B 15/02; G10G 3/00

[52] U.S. Cl. .............................. 345/339; 84/602; 707/530

[58] Field of Search .............................. 395/339, 328, 395/792; 386/52; 84/602, 603, 609, 462; 360/13; 345/326–358; 707/530

[56] References Cited

U.S. PATENT DOCUMENTS

| | | | |
|---|---|---|---|
| 4,526,078 | 7/1985 | Chadabe | 84/602 |
| 4,943,866 | 7/1990 | Barker et al. | 386/52 |
| 5,052,267 | 10/1991 | Ino | 84/613 |
| 5,092,216 | 3/1992 | Wadhams | 84/602 |
| 5,208,421 | 5/1993 | Lisle et al. | 84/645 |
| 5,229,533 | 7/1993 | Sakurai | 84/618 |
| 5,262,580 | 11/1993 | Tanaka et al. | 84/602 |
| 5,281,754 | 1/1994 | Farrett et al. | 84/609 |
| 5,307,456 | 4/1994 | McKay | 345/328 |
| 5,339,393 | 8/1994 | Duffy et al. | 345/328 |
| 5,355,762 | 10/1994 | Tabata | 84/609 |
| 5,388,197 | 2/1995 | Rayner | 345/328 |
| 5,399,799 | 3/1995 | Gabriel | 84/609 |
| 5,430,244 | 7/1995 | Ruffcorn et al. | 84/669 |
| 5,469,370 | 11/1995 | Ostrover et al. | 711/111 |
| 5,519,684 | 5/1996 | Iizuka et al. | 369/93 |
| 5,519,828 | 5/1996 | Rayner | 345/326 |

FOREIGN PATENT DOCUMENTS 9003629 4/1990 WIPO .

OTHER PUBLICATIONS

Andrew Gerzso, "Informatique Et Musique," La Recherche, Sep. 1, 1993, pp. 946–955, vol. 24, No. 257, Paris France.

"Music now Available for Apple II line," Infoworld 16 Sep. 1985 p. 60.

"Mixman", Computer Retail Week, 16 Dec. 1996 p. 41.

International Search Report for Application No. PCT/US 96/19201 Applicant: Joseph S. Gershen.

IBM Technical Disclosure Bulletin "Method of Automatic Audio Marking and Insertion of Canned Audio for Basic Audio Editor"; vol. 31 No. 9 Feb. 1989, pp. 59–65.

2311 Fujitsu Scientific & Technical Journal 26(1990) Autumn, No. 3, Kawasaki, 3P, pp. 207–213.

217 La Recherche; "Informatique Et" 24(1993) Sep., vol. 24, No. 257, pp. 946–955 Paris, FR.

Todd Rundgren; *No World Order;* 1994; published by Electronic Arts. (Copy of packaging attached.).

Medior; *Rock 'N Roll Your Own;* 1995; published by Compton's Newmedia. (Copy of packaging attached.).

*Mixman; See* internet URL http:11www.mixman.com. (Screenshot attached.).

*Primary Examiner*—A. Katbab

*Attorney, Agent, or Firm*—Irell & Manella LLP

[57] ABSTRACT

Methods and apparatus are provided for interactively creating new arrangements of prerecorded musical works. The musical work is represented on a digital medium in the form of a database comprising a plurality of fixed musical sequences, and a template comprising a plurality of sequence positions. Each sequence position may represent one track of a musical arrangement, such as the performance of one instrumental group, or a musical solo. The various tracks are intended to be played simultaneously, in parallel. In addition, some of the sequence positions may represent fixed-length, partial segments of a single track that are intended to be played serially. Using a menu-driven, graphical interface, a user interactively selects a plurality of the fixed musical sequences, as desired, and allocates the selected sequences among the various fixed sequence positions specified by the template. The musical sequences are then combined in accordance with the user's selections, thus creating a new arrangement of the musical work. In this way, users of varying levels of sophistication can be given a musically structured framework for interactively constructing new arrangements of recorded musical works.

24 Claims, 8 Drawing Sheets

METHOD AND APPARATUS FOR INTERACTIVELY CREATING NEW ARRANGEMENTS FOR MUSICAL COMPOSITIONS

FIELD OF THE INVENTION

This invention relates to the field of interactive computer technology, and more particularly to an application of computer technology to the problem of interactively arranging prerecorded musical compositions.

BACKGROUND OF THE INVENTION

Musical works, whether in analog or digital form, have traditionally been sold to consumers in relatively non-interactive forms. For example, a compact disk or audio cassette containing a prerecorded musical performance enables a user to hear and enjoy a faithful reproduction of the original musical performance. However, the user is not expected or encouraged to alter materially the underlying music.

That is not to say that no end-user interaction with music has ever previously been possible. Indeed, compact disk players and even audio cassette players have traditionally allowed users to adjust the volume or even the frequency equalization of recorded music; to rewind, fast-forward, and skip through recorded music; and to rearrange the play order of multiple musical works. However, in the prior art, end-users have generally not been provided with convenient facilities enabling them to dissect a musical work into its component parts, and to rearrange those parts into a new musical work in a musically meaningful manner.

More recently, a number of supposedly "interactive" musical titles have been created for the burgeoning multimedia market, but these titles typically do little more than add graphical liner notes, annotations, and commentary to the underlying musical performance. In other words, by entering interactive input, such as through a mouse or other cursor-control device, users of these prior art titles are able to display corresponding musical lyrics, sheet music, or even video background material about the recording artist, all while listening to the underlying prerecorded composition. Some titles further permit users to adjust the volume or equalization of a given work's constituent components. However, in the prior art, users have not been provided with suitable facilities enabling users to dissect and dynamically reassemble the components of prerecorded musical compositions and thereby interactively create their own, new arrangements of such compositions.

At the other end of the spectrum, various high-end tools do exist which allow the professional recording engineer to digitally process, manipulate, and modify prerecorded music. However, such equipment generally does not impose meaningful, structural constraints on the degree of musical processing and modification that can be performed. In other words, such equipment offers too much freedom and complexity, and not enough structure and guidance, for less sophisticated end-users. In short, what is desired is a structured methodology and architecture that will give end-users with varying levels of musical sophistication the rewarding experience of dissecting and exploring prerecorded musical works, and of interactively constructing new, customized arrangements of those works.

SUMMARY OF THE INVENTION

The present invention provides methods and apparatus for interactively creating new arrangements for prerecorded musical works. In accordance with the present invention, a musical work is stored and represented on a digital medium (such a CD-ROM compact disc) in the form of a digital database comprising a plurality of fixed musical sequences that collectively make up the musical work, and a template specifying a plurality of fixed sequence positions for arrangements of the musical work. Each sequence position in the template may represent a single track within a multi-track musical arrangement, which may correspond to the performance of one instrumental group or of a musical solo, for example. The various tracks of a multi-track arrangement are intended to be played simultaneously, i.e., in parallel. In addition, some of the sequence positions may represent component segments of a single track, intended to be played serially.

This digital medium is provided as input to a digital processor system as described herein. A user then interactively selects a plurality of the fixed musical sequences as desired, and interactively allocates the selected sequences among the various fixed sequence positions defined by the template. Interactive selection is preferably performed using a menu-driven, graphical user interface. The selected musical sequences are then combined in accordance with the user's allocation scheme, thus creating a new arrangement of the musical work.

Preferably, in a further aspect of the present invention, the various musical sequences correspond to performances of the musical work in distinctive musical styles and by different instrument groups. A preferred structure and size is also disclosed for those musical sequences that represent component segments.

FIG. *6a* illustrates a graphical user interface for selecting a version of a track for each one of various instrument groups within the accompanying ensemble.

FIG. *7a* illustrates a graphical user interface for selecting an arrangement of solo segments.

FIG. *7b* shows a display resulting from selecting a solo arrangement.

Figure 8:
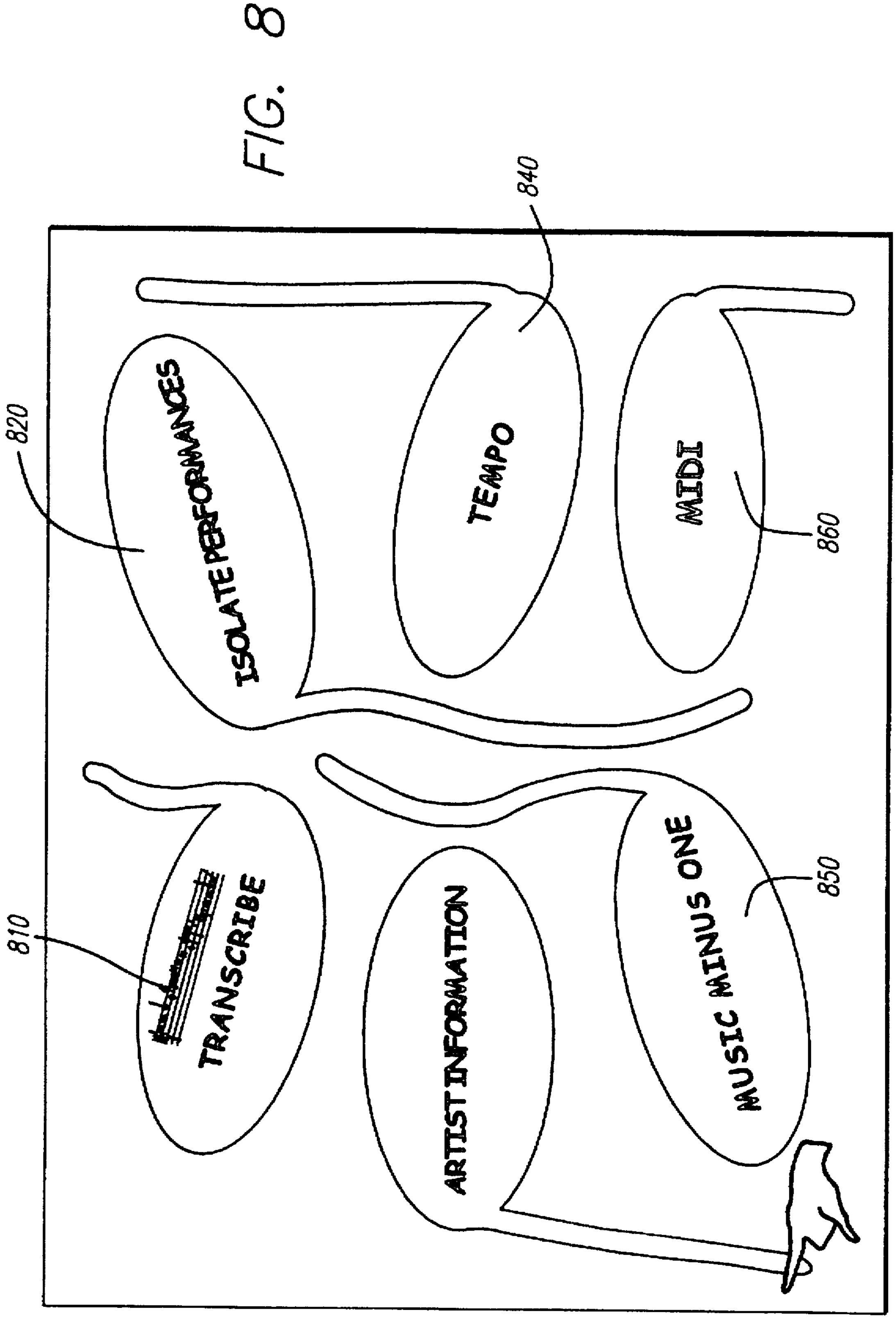

FIG. 8 illustrates a graphical user interface for invoking additional features of a preferred embodiment of the present invention.

DETAILED DESCRIPTION OF THE INVENTION

Figure 1:
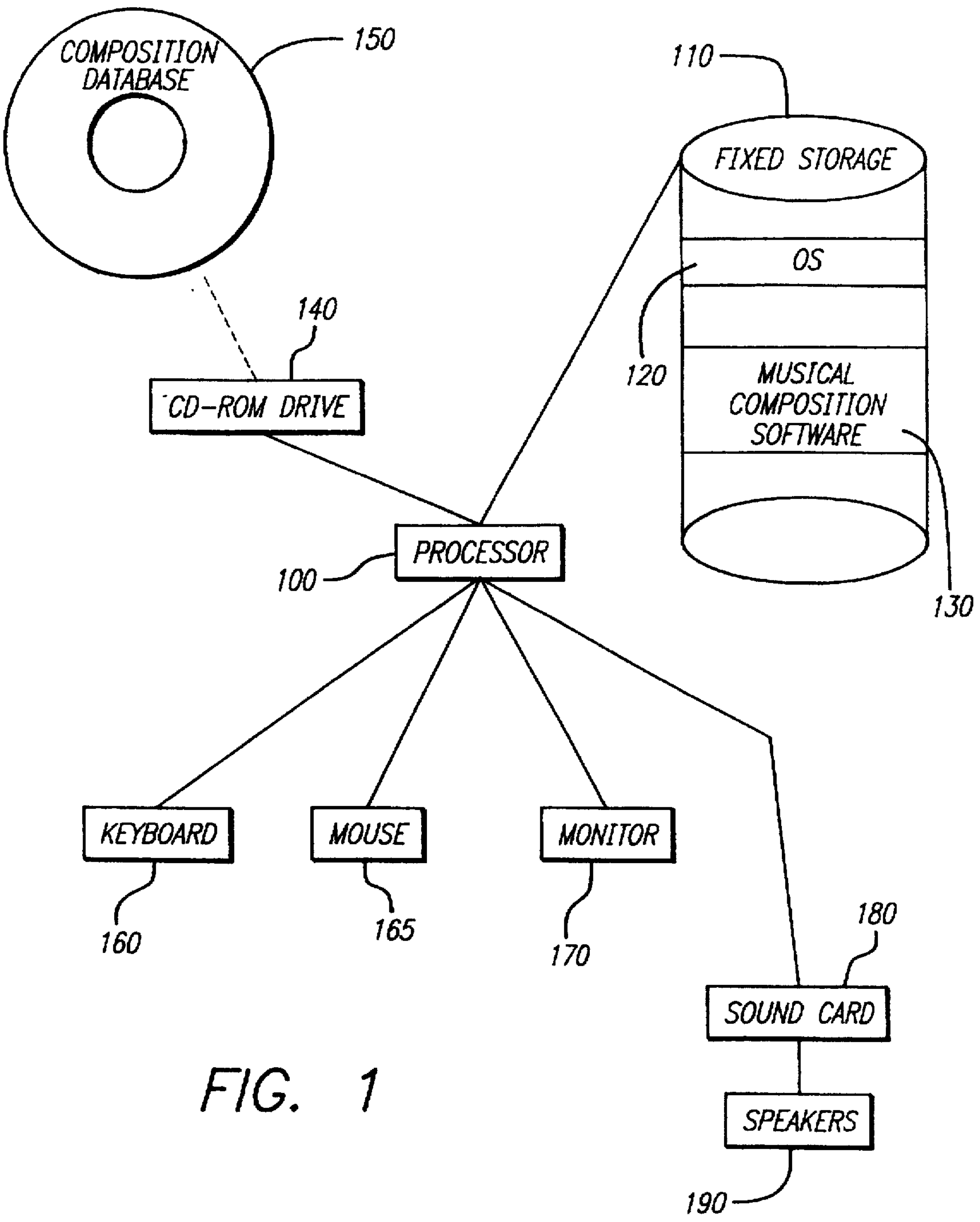
FIG. 1 illustrates a preferred high-level system architecture in accordance with the present invention.

FIG. 1 depicts the general architecture of a digital processor-based system for practicing the present invention. Processor 100 is preferably a standard digital computer microprocessor, such as a CPU of the Intel x86 series, Motorola PowerPC series, or Motorola 68000 series. Processor 100 runs system software 120 (such as Apple Macintosh OS, Microsoft Windows, or another graphically-oriented operating system for personal computers), which is stored on storage unit 110, e.g., a standard internal fixed disk drive. Musical composition software 130, also stored on storage unit 110, includes computer program code for the processing steps described below, including providing graphical user interfaces ("GUI's"), and accessing and assembling digital music tracks and segments in response to interactive user selections. Processor 100 is further coupled to standard CD-ROM drive 140, for receiving compact disc 150 which contains the musical database and template information described in more detail below. Users utilize standard personal computer keyboard 160 and cursor control device 165 (e.g., a mouse or trackball) to enter the GUI input commands discussed below, which are then transmitted to processor 100. Display output, including the GUI output discussed below, is transmitted from processor 100 to video monitor 170 for display to users. Musical works as arranged by processor 100, under the control of composition software 130 and based upon the data of digital medium 150, are transmitted to sound card 180, preferably a standard personal computer sound card, and are thereafter output to audio loudspeakers 190 for listening.

Figure 2:
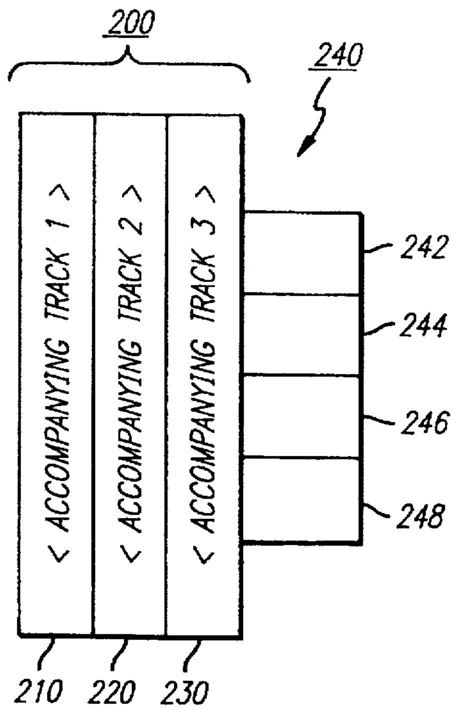
FIG. 2 illustrates a representative architecture for a musical work in accordance with the present invention.

In the preferred embodiment of the present invention, a musical composition as illustrated in FIG. 2, is comprised of an ensemble accompaniment 200 and a simultaneous solo track 240 of shorter duration (in the preferred embodiment eight musical measures long). This structure is intended to correspond to the actual structure of music composition in many classical and popular genres which structures include solo segments and accompaniments incorporated into single musical works.

The ensemble accompaniment 200 is further comprised, in the preferred embodiment, of two or more single instrument tracks. In FIG. 2, these are represented by 210 (accompanying track 1), 220 (accompanying track 2), and 230 (accompanying track 3). According to the present invention, the user may interactively select from a plurality of individual instrumental sections to be composed as a single ensemble accompaniment by combining user selections as accompanying tracks 1, 2, and 3 in the template spaces marked 210, 220, and 230 in FIG. 2, and as further described below.

The solo track 240 is further comprised of four two-musical-measure segments 242, 244, 246, and 248 arranged serially. It is readily apparent that the segments 242, 244, 246, and 248 may be of any uniform length, which length roughly corresponds to natural musical phrases. In accordance with the present invention, the user may interactively select from a plurality of two-measure solo instrumental or vocal sections to re-assemble items 242, 244, 246, and 248 in a different serial order to comprise a new solo track 240, which the digital computer plays back simultaneously with the ensemble accompaniment 200.

The solo track 240; the ensemble accompaniment 200; the accompaniment tracks 210, 220 and 230; and the solo segments 242, 244, 246 and 248 must be of specific durations in order to preserve musical rhythms. Methods of creating digitally encoded sounds of specified durations such that those sounds may reliably be re-assembled in a rhythmically correct manner are well known to those of ordinary skill in the art. SMPTE time code is an example of one such commonly used method.

Figure 3:
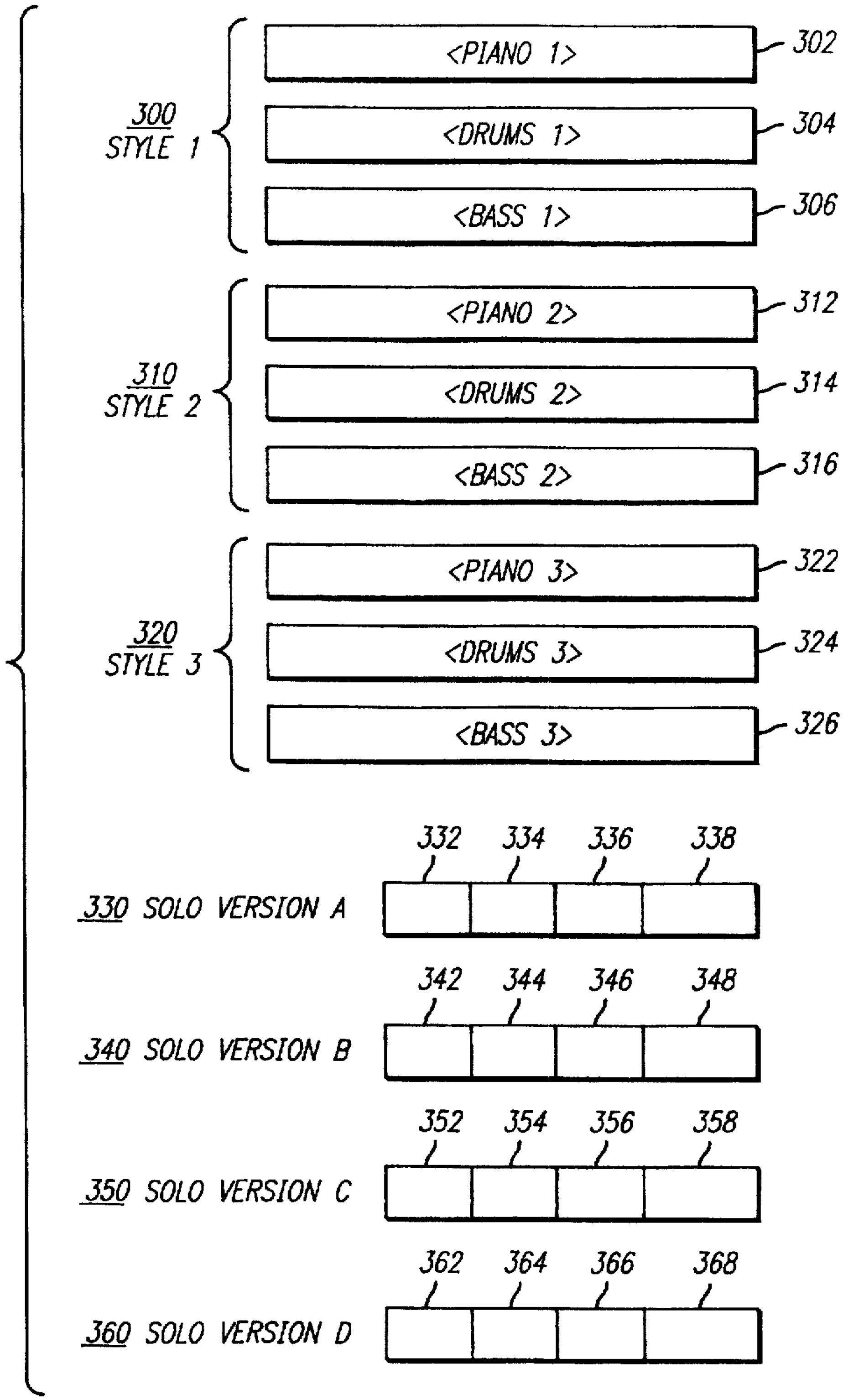
FIG. 3 illustrates a representative architecture for a musical database in accordance with the present invention.

The user interactively selects from a musical database illustrated in FIG. 3 when choosing various musical elements to comprise the musical composition structure illustrated in FIG. 2. In the preferred embodiment, the musical database is comprised of a plurality of pre-selected ensemble accompaniment sections 300, 310, and 320. Each ensemble accompaniment is pre-composed by an expert musician and adheres to a particular musical style, such that ensemble accompaniment 300 adheres to style 1, ensemble accompaniment 310 adheres to style 2, and ensemble accompaniment 320 adheres to style 3. Each ensemble accompaniment is in turn comprised of three or more instrumental parts; for example, piano (segments 302, 312, and 322), drums (segments 304, 314, and 324), and bass (segments 306, 316, and 326). In the preferred embodiment, the user may interactively select one piano segment 302, 312, or 322; one drum segment 304, 314, or 324; and one bass segment 306, 316, or 326, such that each ensemble accompaniment (FIG. 2, Section 200) shall be assembled by the user making these selections for all or some of these three instruments.

The musical database is further comprised in the preferred embodiment of three different solo track versions, from which the user may select two measure blocks to assemble in serial for the solo track represented as block 240 in FIG. 2. Within the musical database, in the preferred embodiment, each of four solo track versions 330, 340, 350, and 360 is comprised of a musical solo as played by a single performer on a single instrument. Each solo track version, in turn, is comprised of four two-musical-measure segments assembled serially so that solo track version A 330 is comprised of two-musical-measure blocks 332, 334, 336, and 338; solo track version B 340 is composed of two-musical-measure blocks 342, 344, 346, and 348; solo track version C 350 is comprised of two-musical-measure blocks 352, 354, 356, and 358; solo track version D 360 is comprised of two-musical-measure blocks 362, 364, 366, and 368. The present invention enables the user interactively to select from any of the twelve two-musical-measure segments comprising all four of the Solo versions when assembling the user's own solo track as represented in block 240 of FIG. 2.

Figure 4:
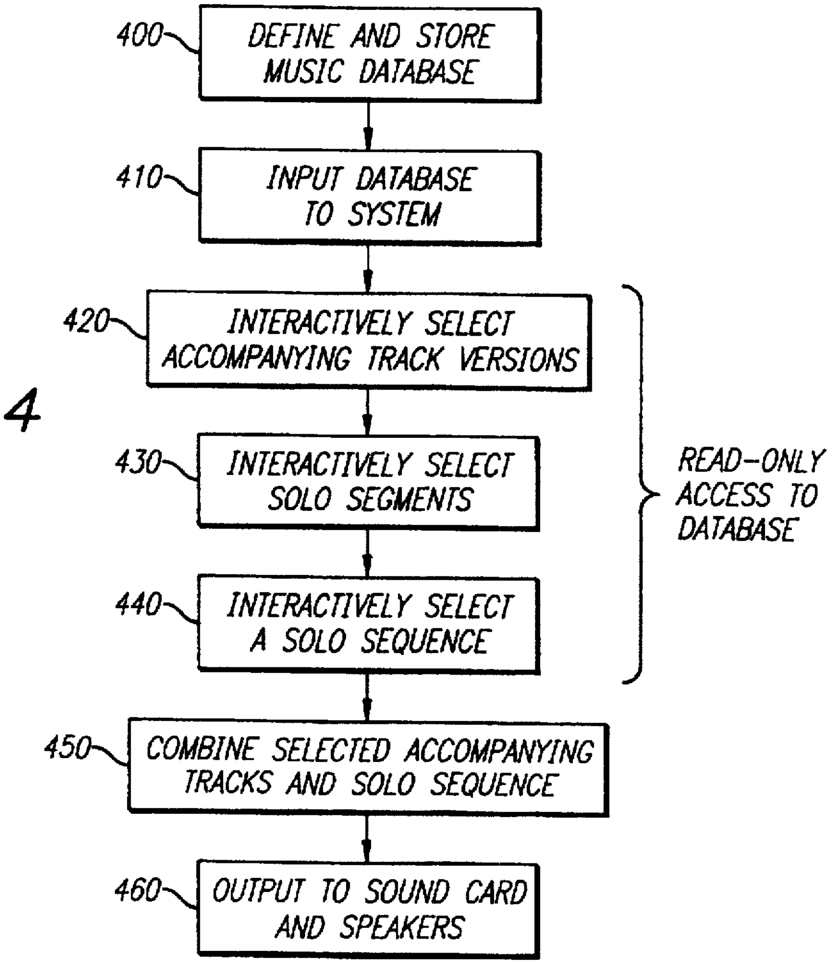
FIG. 4 illustrates a flow diagram for a basic methodology in accordance with the present invention.

Assembly of elements from the musical database represented in FIG. 3 into the musical composition architecture represented in FIG. 2 follows the steps illustrated in FIG. 4.

The music database described above is defined, stored and inputted into a memory device, which, in the preferred embodiment, is the compact disk 150. As previously described, the present invention enables the end-user of the compact disk 150 to interactively select elements from the pre-selected music database stored on the Compact Disk 150 and interactively assemble such selections into the musical composition architecture illustrated in FIG. 2. FIG. 4 is a flow diagram showing the basic steps of this process. At step 400, a music expert defines sections of a pre-recorded musical performance and divides them into the ensemble accompaniment Tracks and solo tracks as discussed above. At step 410, that definitional information is inputted into the database and recorded on the Compact Disc 150 for end-user use (such as a CD-ROM, or internet server). Steps 420, 430, and 440 illustrate the end-user's "Read Only" access to the pre-defined music database. At step 420, the present invention permits end-users to interactively select accompanying tracks to comprise the ensemble accompaniment 200 section of the musical composition. At step 430, the present invention allows the end-user interactively to select the solo segments 242, 244, 246, 248. At step 440, the present invention permits the end-user interactively to select a serial sequence for the solo segments selected in step 430.

At step 450, the present invention, using time code, that has been inputted into the database at step 410, combines the accompaniment tracks 210, 220 and 230 into the ensemble accompaniment 200 and combines the solo segments 242, 244, 246, and 248 into the sequence selected by the end-user to comprise the solo track 240. The timecode designation may be according to SMPTE or other well known methods. At 460, the present invention outputs the user-defined musical arrangement to the computer sound-card and speakers.

The great variety of different musical variations obtainable under the present invention is worthy of note. 559,872 different musical compositions may be assembled based only on the 21 musical components contained in the preferred embodiment. Three styles are available for each of three instruments used to comprise the ensemble accompaniment, for 27 (3*3*3=27) possible compositions of the ensemble accompaniment 200. 12 individual solo segments are available for each of the solo segments 242, 244, 246, and 248, for 20,736 possible compositions of the solo track 240. In total there are 27 ensemble accompaniments which may be combined with any of 20,736 solo tracks for 559,872 different musical compositions which end users may create using the preferred embodiment of the present invention.

Figure 5:
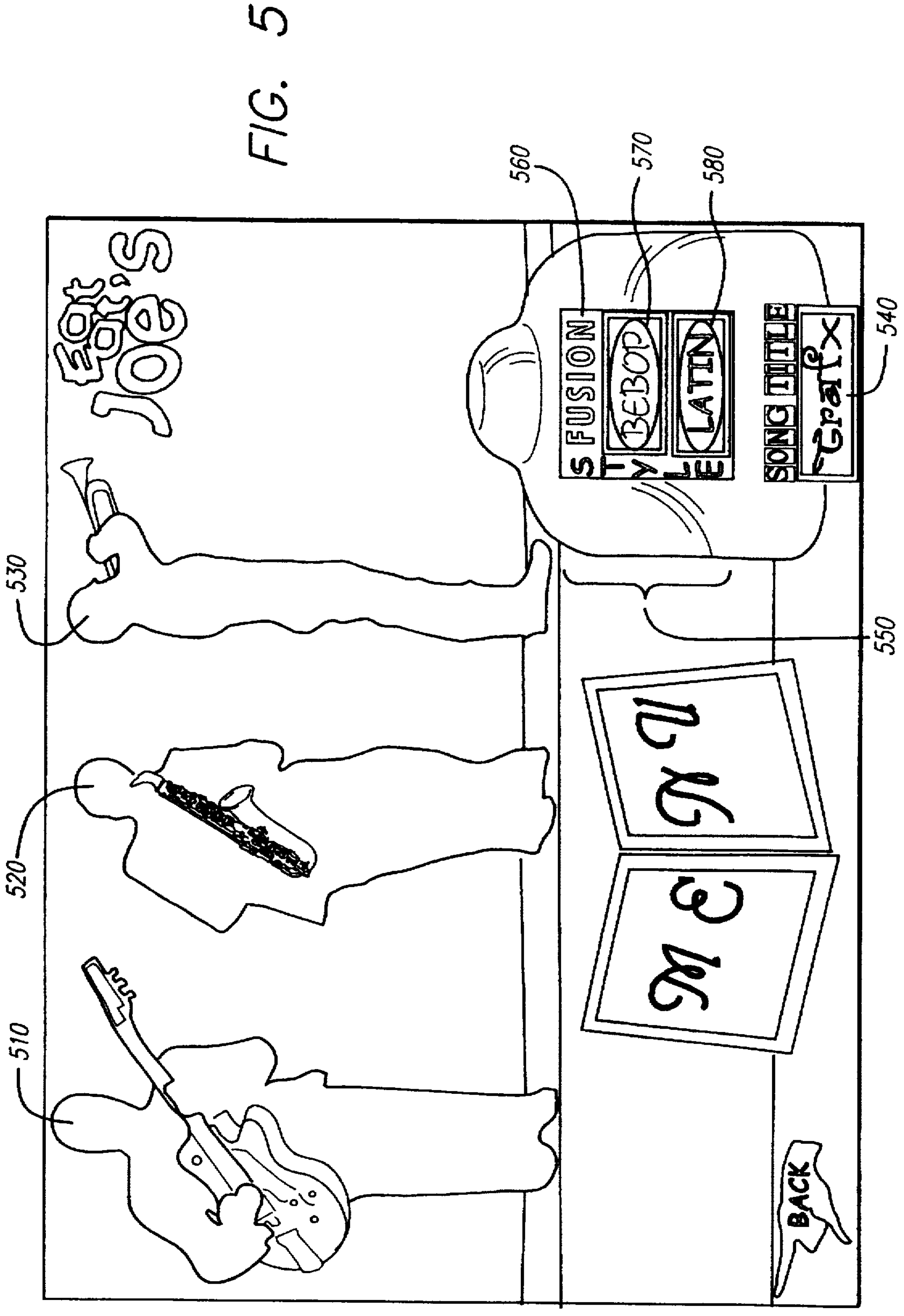
FIG. 5 illustrates a graphical user interface for selecting a style of an accompanying ensemble.

FIG. 5 is a sample user interface from which the end-user may interactively select styles for ensemble accompaniments in accordance with the present invention. Block 540 displays the title of the overall musical composition. Block 550 displays the user's choices of ensemble accompaniment styles. In this illustration, the user may select from fusion style icon 560, be-bop style icon 570, or latin style icon 580. When the user clicks on the fusion style icon 560 in this illustration, he hears the fusion style ensemble accompaniment playing through the sound card 180 and the loudspeakers 190. When the user clicks on the be-bop style icon 570 in this illustration, he hears the be-bop style ensemble accompaniment playing through the sound card 180 and the loudspeakers 190. When the user clicks on the latin style icon 580 in this illustration, he hears the latin style ensemble accompaniment playing through the sound card 180 and the loudspeakers 190. Furthermore, in this illustration, the blocks 510, 520, and 530 illustrate the identity of the solo artists performing the solo segments.

Figure 6A:
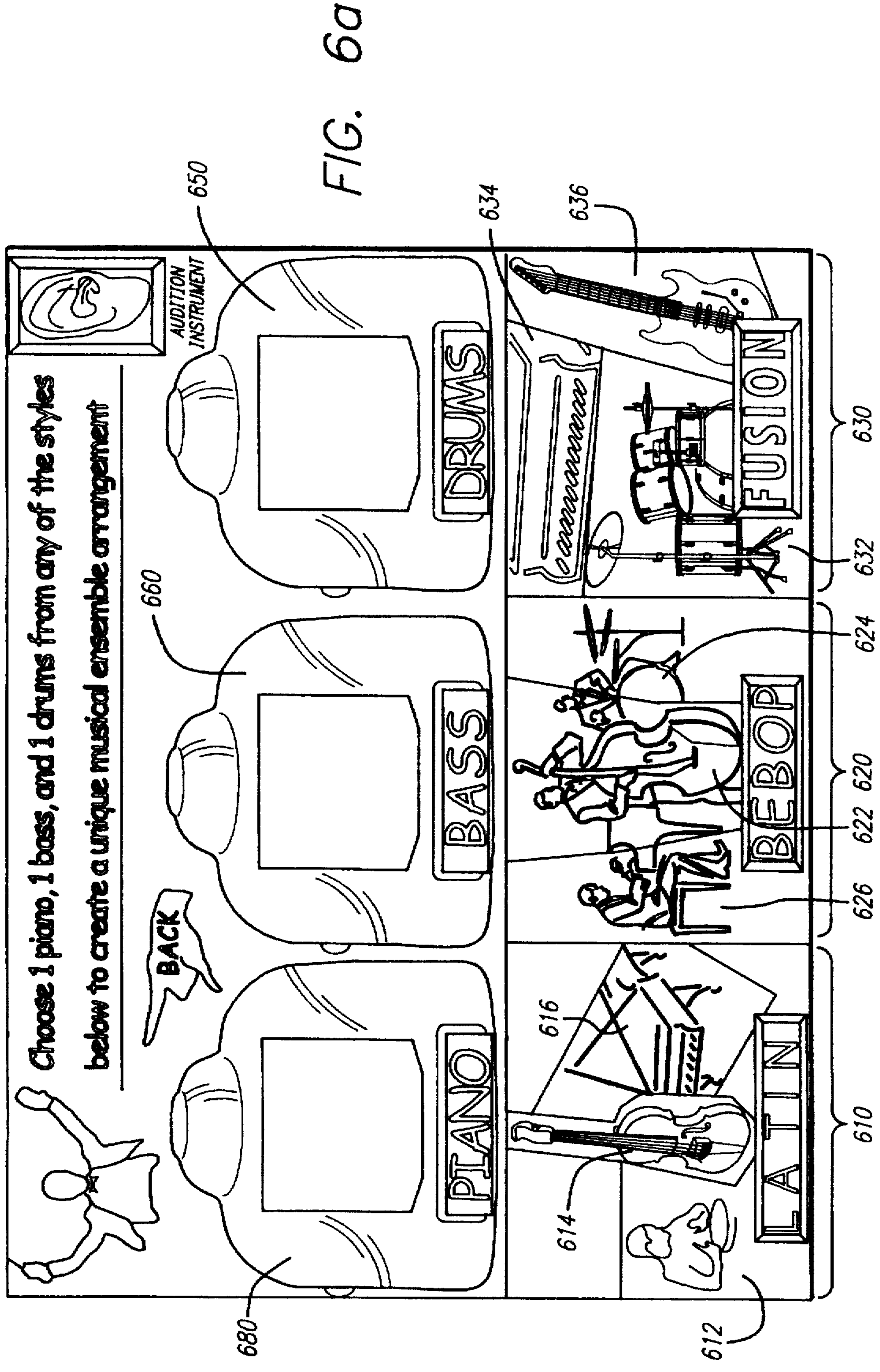

In the preferred embodiment, the user may interactively select three instrumental tracks that comprise the ensemble accompaniment: piano, drums and bass. FIG. 6-A illustrates a graphical user interface permitting the user to select the desired musical style for each of the three instrument accompanying tracks within the ensemble accompaniment. For each instrument (bass, drums and piano), the user may select from one of three styles: a latin icon 610 latin, a be-bop icon 620, or a fusion icon 630. By clicking on the corresponding image, the user may interactively select a drums version (612, 624, and 632), a bass version (614, 622, and 636), and a piano version (616, 626, and 634). In the current illustration, the user's drums selection appears in a juke box icon 640; the user's bass selection appears in a juke box icon 660; and the user's piano selection appears in juke box 680.

Figure 7A:
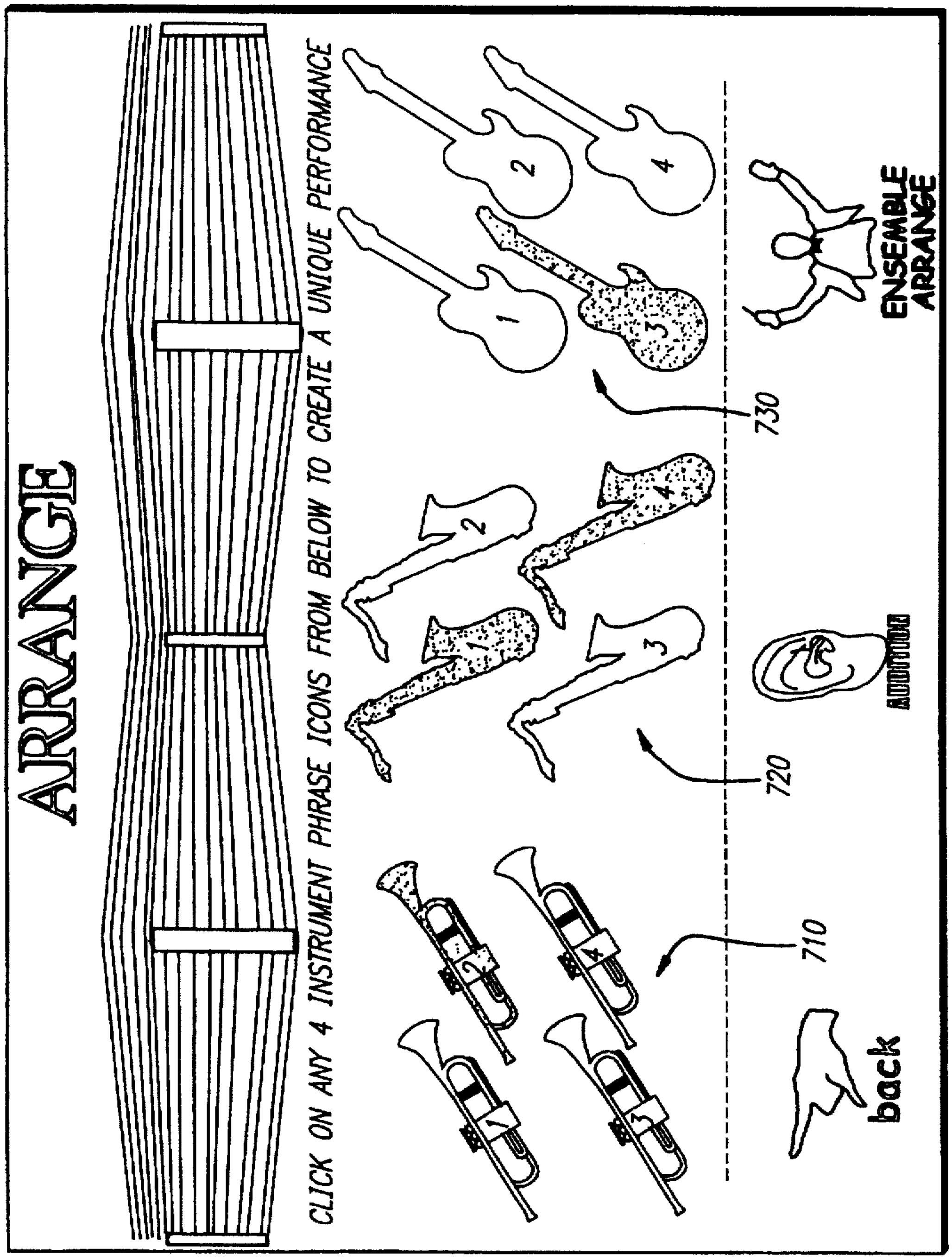

FIG. 7A illustrates a screen that allows users to select the four two-musical measure segments that comprise the eight measure solo track in the preferred embodiment. In the present illustration, icons representing the four segments of a trumpet solo track 710 are arranged in the order intended by the original performer or musical expert (first 712, then 714, then 716, and last 718). Similarly, icons representing saxophone and guitar solo tracks (720 and 730, respectively) are arranged in the order intended by the original performer or musical expert (saxophone: first 722, then 724, then 726 and last 728; guitar: first 732, then 734, then 736, and last 738.) The user may listen to or audition any particular solos segment by first clicking on the desired segment icon (712, 714, 716, 718, 722, 724, 726, 728, 732, 734, 736 or 738) and then clicking on an audition button 780. For instance, if the user first selected segment icon 722, and then clicked on the audition button 780, he would hear the first individual segment of the saxophone solo track. In order to assemble four solo segments into the solo track 240, the user clicks on each desired solo segment icon and then drags the selection into one of four desired sequence positions represented by icons 740, 750, 760, and 770. The solo segment icon placed in the position 740 will play first. The solo segment icon placed in position 750 will play second. The solo segment icon placed in position 760 will play third, and the solo segment icon placed in position 770 will play last. In the present illustration when the user selects a button 790, the computer system in FIG. 1 plays the entire user defined musical composition, including solo track and ensemble accompaniment.

Figure 7B:
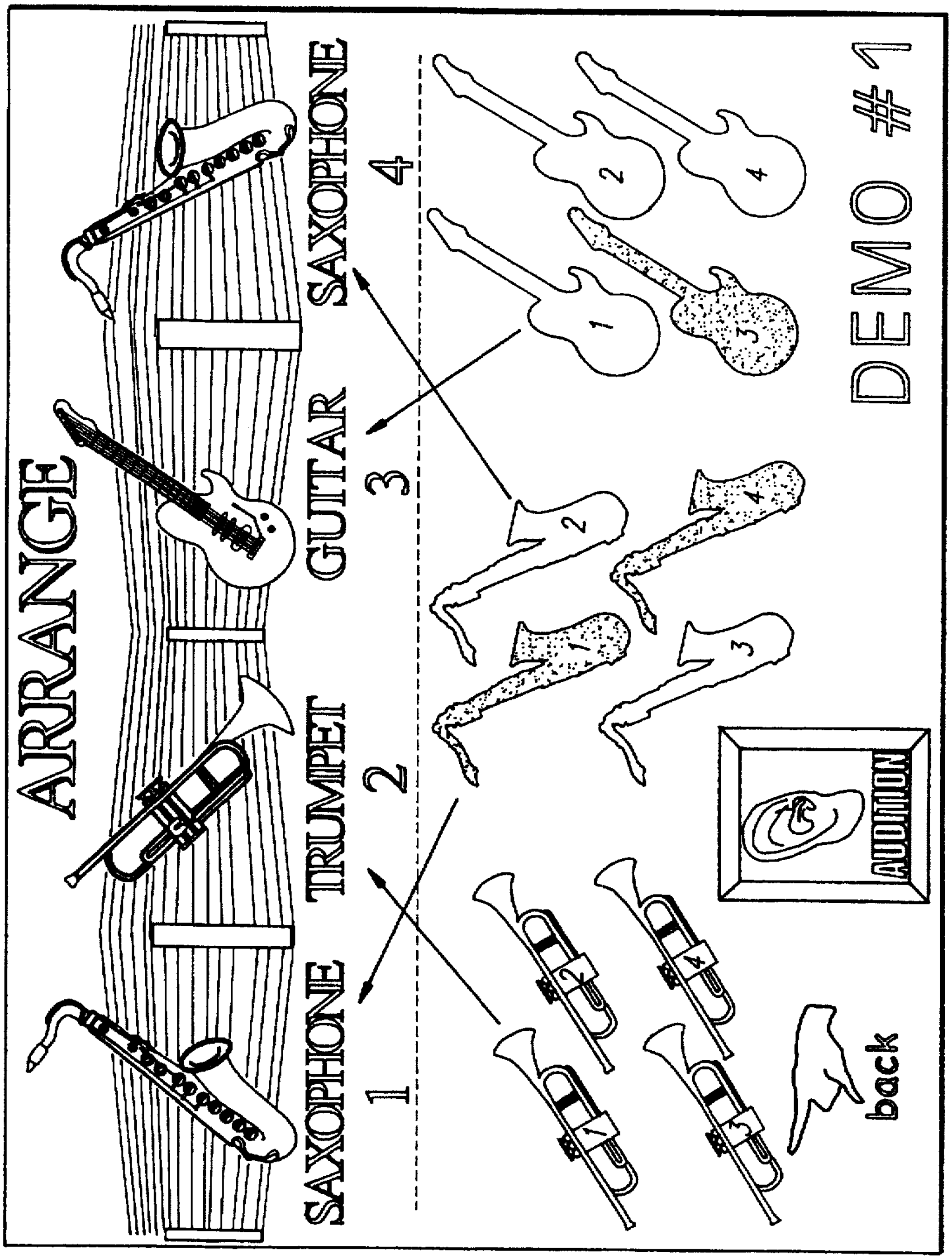

Once the user interactively selects solo segments by clicking on individual solo segments and dragging them into the sequence position icons 740, 750, 760 and 770 in sequence, the display shown in FIG. 7-B results. The preferred embodiment of the present invention permits users to access other information about the music and manipulate the music in other ways.

FIG. 8 illustrates a graphic user interface for invoking these additional features of a preferred embodiment of the present invention. By interactively selecting an icon 810 the user may view a transcription of his own musical composition created in accordance with the present invention. By clicking on an icon 820 the user may listen to individual instrumental voices within the musical composition he created in accordance with the present invention, or the original musical composition intended by the original performer. By clicking on an icon 830, the user can view additional data pertaining to the musical performers, including video text and interviews. By clicking on an icon 840 the user may speed up or slow down the tempo of his own musical composition created in accordance with the present invention, or the musical composition as intended by the original performer. Because the present invention is implemented through the use of digitally encoded audio, the tempo of music may be slowed down or increased without affecting the music's timbre or pitch. By clicking on an icon 850 the user may select individual voices or instruments to be deleted from the musical composition created by user in accordance with the present invention or the original musical composition as intended by the original performer. By clicking on an icon 860 the user may access the MIDI-code of the user's own musical composition assembled in accordance with the present invention, or the musical composition as intended by the original performer. Accessing the MIDI-code corresponding to the digitally encoded audio allows the user to manipulate the musical composition using a variety of third-party computer software music tools.

Other Variations

Detailed illustrations and preferred embodiments of the present invention have been provided herein for the edification of those of ordinary skill in the art, and not as a limitation on the scope of the invention. Numerous variations and modifications within the spirit of the present invention will of course occur to those of ordinary skill in the art in view of the preferred embodiments that have now been disclosed. Such variations, as well as any other systems embodying or practicing any of the following claims, all remain within the scope of the present invention:

I claim:

1. A method for creating a new arrangement of a musical work, said method for use with a digital processor and comprising the following steps:

storing a musical database defining a plurality of fixed musical sequences representing the musical work, and a musical template defining a plurality of fixed sequence positions with reference to time, said template representing the musical work;

providing the musical database and the musical template as an input to the digital processor;

interactively selecting a plurality of the fixed musical sequences, as desired by an end-user;

interactively allocating the selected musical sequences among the fixed sequence positions of the template, as desired by the end-user; and combining the selected musical sequences in accordance with the desired allocation, thereby creating the new arrangement of the musical work.

2. The method of claim 1, wherein a plurality of the fixed sequence positions of the template represent parallel tracks, and wherein the step of combining the selected musical sequences includes integrating the selected musical sequences allocated to the parallel tracks in a parallel manner.

3. The method of claim 2, wherein the selected musical sequence allocated to each of the parallel tracks represents a performance of the musical work in a distinctive style.

4. The method of claim 2, wherein the selected musical sequence allocated to each of the parallel tracks represents a distinctive instrument group.

5. The method of claim 1, wherein a plurality of the sequence positions of the template are component segments of a single track; and wherein the step of combining the selected musical sequences includes integrating the selected musical sequences allocated to the component segments in a serial manner.

6. The method of claim 5, wherein the step of interactively allocating the selected musical sequences among the sequence positions includes assigning one of the selected musical sequences to each of the component segments and specifying a desired playing order for the musical sequences assigned to the component segments.

7. The method of claim 5, wherein each of the component segments is a fixed number of musical measures in length.

8. The method of claim 7, wherein the fixed number of musical measures is two.

9. The method of claim 7, wherein the fixed number of musical measures is any fixed number of measures the length of which roughly corresponds to the length of natural musical phrases.

10. The method of claim 1, wherein the musical sequences each comprise digitally sampled music.

11. The method of claim 1, wherein the musical database is stored on a read-only digital medium.

12. The method of claim 1, wherein the steps of interactive selection are performed using a menu-driven graphical user interface.

13. The apparatus of claim 5, wherein the means for interactively allocating the selected musical sequences among the sequence positions include means for assigning one of the selected musical sequences to each of the component segments, and means for specifying a desired playing order for the musical sequences assigned to the component segments.

14. The apparatus of claim 5, wherein each of the component segments is a fixed number of musical measures in length.

15. The apparatus of claim 7, wherein the fixed number of musical measures is two.

16. The apparatus of claim 7, wherein the fixed number of musical measures is any fixed number of measures the length of which roughly corresponds to the length of natural musical phrases.

17. An apparatus for creating a new arrangement of a musical work, comprising:

one or more digital media storing a musical database, said database defining a plurality of fixed musical sequences with reference to time, said template representing the musical work, and further storing a musical template defining a plurality of fixed sequence positions representing the musical work; and a digital processor system further comprising:

input means for reading the contents of the digital media;

means for interactively selecting a plurality of the fixed musical sequences, and for interactively allocating the selected musical sequences among the fixed sequence positions of the template, as desired by the end-user; and means for combining the selected musical sequences in accordance with the desired allocation, thereby creating the new arrangement of the musical work.

18. The apparatus of claim 17, wherein a plurality of the fixed sequence positions of the template represent parallel tracks, and wherein the means for combining the selected musical sequences include means for integrating the selected musical sequences allocated to the parallel tracks in a parallel manner.

19. The apparatus of claim 18, wherein each one of a plurality of the selected musical sequences represents a performance of the musical work in a distinctive style.

20. The apparatus of claim 18, wherein each one of a plurality of the selected musical sequences represents a distinctive instrument group.

21. The apparatus of claim 17, wherein a plurality of the sequence positions of the template are component segments of a single track; and wherein the means for combining the selected musical sequences include means for integrating the selected musical sequences allocated to the component segments in a serial manner.

22. The apparatus of claim 17, wherein the musical sequences each comprise digitally sampled music.

23. The apparatus of claim 17, wherein the digital media comprise one or more read-only digital media.

24. The apparatus of claim 17, wherein means for performing interactive selections comprise means for generating a menu-driven graphical user interface.

* * * * *